United States Patent [19]

Saito

[11] 3,947,660
[45] Mar. 30, 1976

[54] CASH REGISTER COMPUTING SYSTEM

[76] Inventor: Yutaka Saito, No. 21, Koaza Ryuto, Aza Shimoueno, Oyamazaki-cho, Otokuni, Kyoto, Japan

[22] Filed: Oct. 3, 1974

[21] Appl. No.: 511,723

[30] Foreign Application Priority Data
Oct. 6, 1973  Japan.............................. 48-112537

[52] U.S. Cl.. 235/61.6 R; 235/61.9 R; 235/61.11 E
[51] Int. Cl.$^2$. G06K 15/00; G06K 3/00; G06K 7/10
[58] Field of Search ..... 235/61.6 R, 61.7 R, 61.7 B, 235/61.9 R, 61.11 E, 61.11 R

[56] References Cited
UNITED STATES PATENTS
3,845,280   10/1974   Dillon et al. ................. 235/61.11 R

*Primary Examiner*—Daryl W. Cook
*Attorney, Agent, or Firm*—Kurt Kelman

[57] ABSTRACT

Each item in a transaction has a card or ticket having markings signifying its price and category in machine readable form. As each item is purchased, the ticket is inserted into an automatic read-out system. The price and category markings are transduced into signals stored in a first and second buffer storage, respectively. A code converter connected to the second buffer storage operates to furnish a pulse to a corresponding one of a plurality of counters in response to each category signal. The signals in the first buffer storage are added, in turn, by a price adder whose final output therefor shows the total price of all items in the transaction. A grand total adder operates in parallel with the price adder and is cleared after predetermined time periods rather than after each transaction. The signals from the price adder and the grand total adder are supplied through multiplexers to series display and printout devices. A switch is furnished to convert the system to a computer only by disabling the print-out, display, and grand total circuits.

21 Claims, 12 Drawing Figures

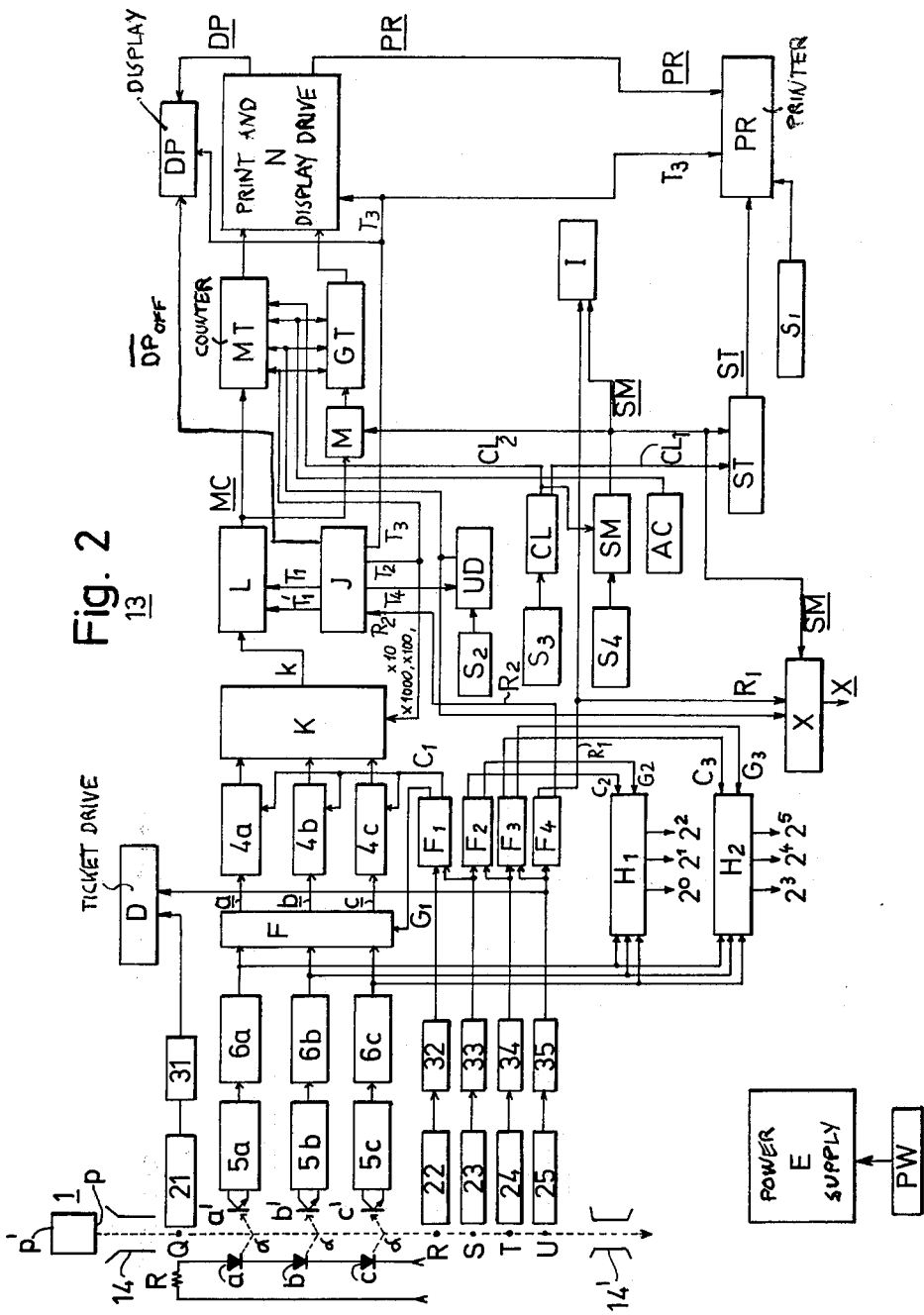

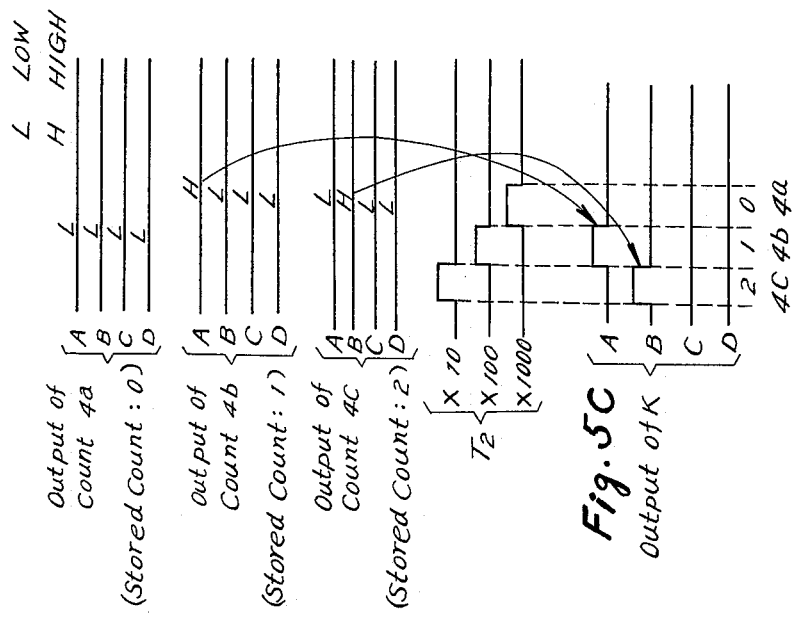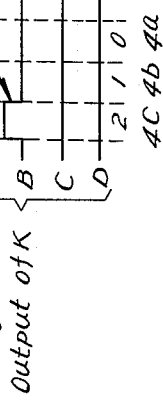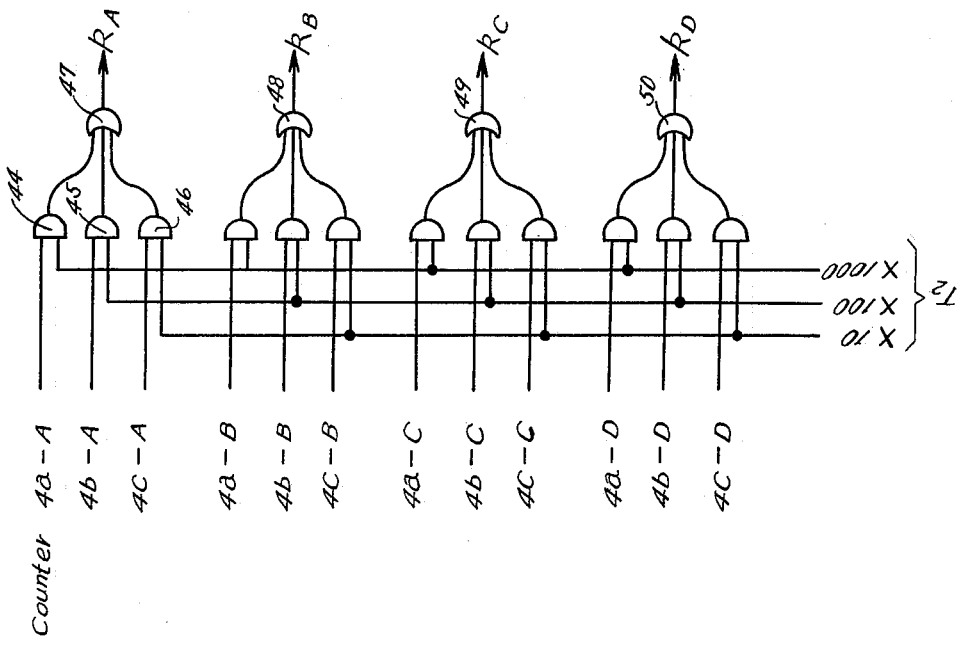

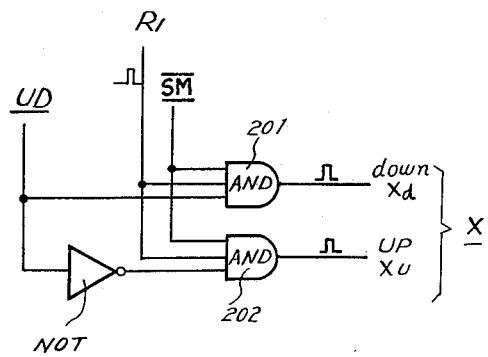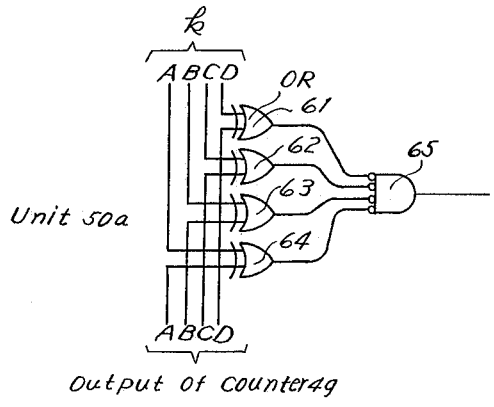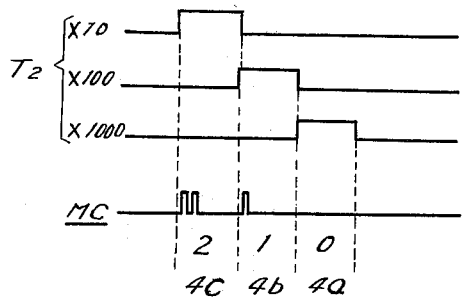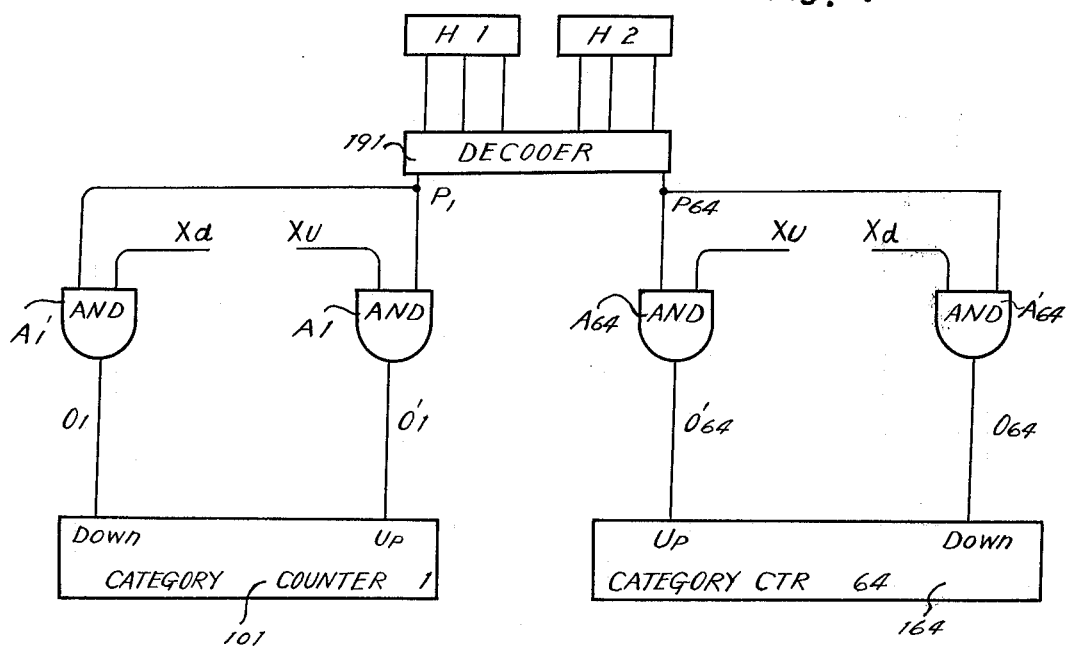

CASH REGISTER COMPUTING SYSTEM

The present invention relates to computer systems for cash registers. In particular, it relates to computer systems wherein both the total price of articles involved in one particular transaction and the category of the articles in the transaction will be determined automatically.

In the conventional operation of a cash register, each article purchased by a customer has a ticket indicating its price to the cashier. The cashier then totals the prices of all the articles on a calculator. Such computations by a cashier is time consuming and also tends to introduce errors into the computation.

The present invention provides a cash register computing system for furnishing first and second output signals respectively signifying the total price of the plurality of items in a transaction and the total number of items in each of a determined plurality of categories in the transaction. It comprises a ticket for each item, the ticket having machine readable markings signifying the price and the category of the item. The system comprises read-out means for reading out the price and category markings and furnishing corresponding price and category marking signals. It comprises first and second buffer storage means connected to the readout means for storing the price and category marking signals, respectively. It further comprises price adder means connected to the buffer storage means for adding stored price marking signals read from each of the tickets to stored price marking signals read from previous tickets in the transaction and furnishing the first output signals following addition of stored price marking signals read from the last of the tickets in the transaction. The system further comprises a plurality of category adder means connected to the second buffer storage means, each for counting category marking signals signifying a predetermined one of the categories, whereby each category adder means furnishes a signal signifying the total number of items in the associated category in the transaction.

It will be noted that a system in accordance with this invention completely eliminates the need for the cashier to carry out any operation other than the insertion of the ticket into a slot carrying it past the read-out means. This, in turn, reduces the waiting time for each customer and prevents the introduction of human error into the price charged the customer.

It should further be noted that the tickets for each item are not restricted to tickets attached in a department store but may equally well be tickets utilized in a restaurant to indicate the type of food sold to a customer. The tickets may further be tickets used, for example, in a manufacture's inventory proceedings.

Additional advantages and features of the present invention will be more clearly understood from the following detailed description, taken in connection with the accompanying drawing, in which:

FIG. 2 is a block diagram of the overall system;

FIG. 5a is a more detailed diagram of the counter output gating circuit (K) of FIG. 2;

FIG. 5b is a table showing the outputs of the circuit of FIG. 5a in response to price markings of the ticket shown in FIG. 1, and the associated clock pulses;

FIG. 5c is a timing diagram corresponding to FIG. 5b;

FIG. 6b is a more detailed diagram of the comparator (550) of FIG. 5a;

FIG. 6c is a timing diagram illustrating the operation of the circuit of FIG. 6a;

FIG. 8 is a more detailed circuit diagram of the category counter control circuit (X) of FIG. 2; and FIG. 9 shows the code converter and category counters associated with units $H_1$ and $H_2$ of FIG. 2.

Figure 1:
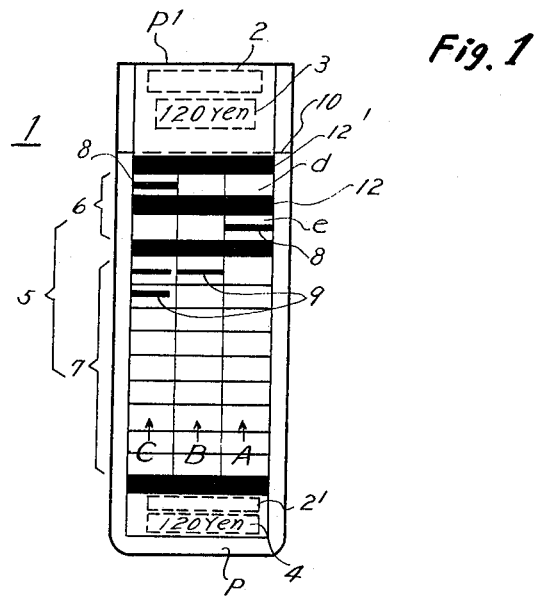
FIG. 1 shows a meal ticket usable in the system of the invention.

A preferred embodiment of the present invention will now be described with reference to the drawing.

FIG. 1 shows a meal ticket usable in the present invention. It is a beverage ticket and the price of the beverage is 120 yen. The ticket shown in FIG. 1 has areas 2 and 2' showing the name of the item purchased, and areas 3 and 4 showing the price of the item. Machine readable markings are present in a region 5 which is subdivided into a first region 7, carrying the price markings, and a second region 6, carrying the category markings. Region 5 is divided into three columns A, B, C. The columns each represent a decimal place in the price of the item, each horizontal line in colunn A representing 1,000 yen, each horizontal line in column B representing 100 yen and each horizontal line in column C representing 10 yen. Thus the price representing 120 yen is represented by two horizontal lines 9 in column C, one line in column B and no lines in column A.

The category marking region 6 comprises several horizontal lines, two in the example, and also three columns. Each catagory is signified by a different combination of horizontal lines 8, such as the lines in column A and in column C shown in FIG. 1. While the horizontal lines shown in FIG. 1 are in particularly suitable for read-out by optical means, other category and price markings, such as pumched holes, magnetic marks, etc., may be used to replace these optical markings. Dotted line 10 indicates machine perforations which may be provided if necessary. Horizontal lines 11, 11', 12 and 12' are also suitable for optical read-out.

A diagram of the overall system is shown in FIG. 2. The read-out means 13 comprises three light-emitting diodes *a*, *b* and *c* energized from a power supply E. These diodes are positioned so that each illuminates a corresponding one of the columns A, B, C of ticket 1 as the ticket passes along its predetermined path. As shown, ticket 1 is inserted into a slit 14 and then transported along a predetermined path extending in the direction of columns A, B and C by ticket drive D. In the preferred embodiment of the present invention, this ticket drive is a conveyor belt. After the ticket has been transported in the direction of the arrow past the read-out means, it is released from the path through an outlet 14'. During the transport of the ticket along the predetermined path, the circuit operates as follows:

When the lower edge *p* of the ticket first passes point Q just below inlet 14, a first position detector switch (part of the position control means) 21 disposed at point Q will operate. The signal for operating switch 21 may, for example, be produced by interrupting the light beam generated by a light-emitting diode disposed on one side of the ticket and falling on a photoelectric element or phototransistor disposed on the other side of the ticket by the bottom edge of ticket 1. Alternatively, it may be supplied by operating a lever or limit switch or by sensing a punched hole or magnetic mark provided on the ticket. In any case, operation of the detector switch 21 causes an output signal to be applied through amplifier 31 to the ticket driving motor D. The ticket is then transported downward until horizontal line 11' passes through the read-out location where light-emitting diodes $a, b, c$ and corresponding photoreceivers $a', b', c'$ are positioned. At this point, the bottom end p of the ticket will pass position R where a second position control switch 22 will be activated to produce an output signal which, after amplification by amplifier 32, is applied to a pulse generator circuit $F_1$. The latter circuit is shown in more detail in FIG. 3. Let it suffice to say here that application of a pulse to circuit $F_1$ causes a clear pulse $C_1$ to be applied to the first buffer storage means which comprises counters $4a, b, c$. Further, a gating pulse $G_1$ is generated which causes gate F to become conductive.

As the ticket passes the read-out location, the light beams from light-emitting diodes $a, b$ and $c$ illuminate columns A, B and C, respectively, in such a manner that the respective reflected light will be incident on photo-transistor $a', b'$ and $c'$, respectively. The absence of such light will thus indicate the presence of price markings 9. These price markings in each column will thus be read out in series, applied to the respective amplifiers 5a, 5b and 5c and then, respectively, to pulse forming circuits 6a, 6b, and 6c. Since gate F is conductive, the read-out pulses will be applied to counters 4a, 4b and 4c, respectively. The count in each of the counters thus represents the number of price markings read out in the corresponding decimal place or column.

When horizontal line 11 separating the price and category regions passes read-out location $\alpha$, the bottom end $p$ of the ticket will pass by point S. This causes the third position control switch 23 to be actuated. The resulting position control signal, after amplification in amplifier 33, is applied to pulse generating circuit $F_1$ to cancel gating signal $G_1$. It is further applied to the input of pulse generating circuit $F_2$, which causes this pulse generating circuit to generate a clear signal $C_2$ for clearing the part $H_1$ of the second buffer storage means. Further, a gating signal $G_2$ is generated for enabling the counter which is comprised in the second buffer storage means to respond to the signals applied at the counting input.

When the category markings, including, first, mark 8 in line $e$, pass the read-out location, any signals read from any of the columns will be amplified by amplifier circuits 5a, 5b and 5c and again formed into pulses by pulse forming circuit 6a, 6b and 6c. The signals at the outputs of pulse forming circuit 6a, 6b and 6c are then applied to the inputs of unit $H_1$ where they are stored. Specifically, since unit $H_1$ is a binary counter, the output signals of unit $H_1$ signify $2^0, 2^1$ and $2^2$, respectively.

At the time line 12 passes the read-out location, bottom $p$ of the ticket passes point T. The fourth position control switch 24 is thus activated and a signal is applied through amplifier 34 to the input of a pulse generating circuit $F_3$. Also, a signal is applied to circuit $F_2$ to stop gating pulse $G_2$ and thereby block the input to unit $H_1$. The pulse applied to unit $F_3$ causes a clear pulse $C_3$ to be applied to unit $H_2$ which is the second counter in the second buffer storage means. Further, a signal $G_3$ which enables counter $H_2$ is also applied.

When line 8 passes the read-out means, the resulting signal at the output of pulse former 6c will be applied to the counting input of counter $H_2$. It should be noted that this again is a binary counter, the outputs of this counter signifying $2^3, 2^4$ and $2^5$, respectively.

When line 12' passes the read-out location, the bottom end p of ticket 1 will pass point U, activating position control switch 25. After amplification in amplifier 35, the pulse furnished by switch 25 is applied to a pulse generator $F_4$, causing the generation of pulses $R_1$ and $R_2$ which will be further discussed below. It is also applied to pulse generator $F_3$ to stop the generation of gating signal $G_3$, thereby preventing any further inputs to counter $H_2$.

When the top edge $p'$ of the ticket passes switch U, a pulse is furnished at the output of amplifier 35, which stops ticket drive D. The ticket is then released from outlet 14'.

Figure 3:
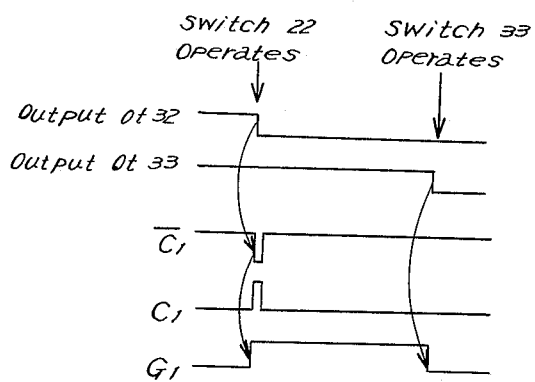
FIG. 3 is a more detailed diagram of one of the pulse generating circuits of FIG. 2.

FIG. 3 shows a preferred embodiment of pulse generator $F_1$. When the output of amplifier 32 changes from a high to a low level, a short pulse generating circuit which, in a preferred embodiment is a monostable multivibrator, furnishes a negative going pulse of relatively short time duration. This pulse passes an inverter (NOT circuit) the output of which is a positive going pulse $C_1$. Pulse $C_1$ is also used to set a flip-flop $FF_1$ which is reset when the output of amplifier 33 makes the transistion from positivve to negative. The "1" output of flip-flop $FF_1$ is gating pulse $G_1$. Pulse generator circuits $F_2, F_3, F_4$ are identical to the circuit shown in FIG. 3 and will not individually be shown here.

Again referring to FIG. 2, the above mentioned pulse $R_1$ from the output of pulse generator $F_4$ is used to release the cash box in the cash register (I, FIG. 2). Pulse $R_2$ is used to initiate the transfer of the data stored in counters 4a, 4b and 4c to the price adder means MT. It must be kept in mind that counter 4c stores a binary coded number having bits A, B, C, D and representing the tens place of the price of the item. Similarly counters 4b and 4a store binary coded decimal signals respectively representing the hundreds and thousands decimal place of the price of the item. It is now desired that the signals stored in counters 4c, 4b and 4a be gated in a predetermined order to the output k of circuit K. This will be discussed in greater detail with reference to FIG. 5a. The $\times 10, \times 100 \times 1000$ signals required for this gating are generated in block J of FIG. 2 which is shown in greater detail in FIG. 4.

Figure 4:
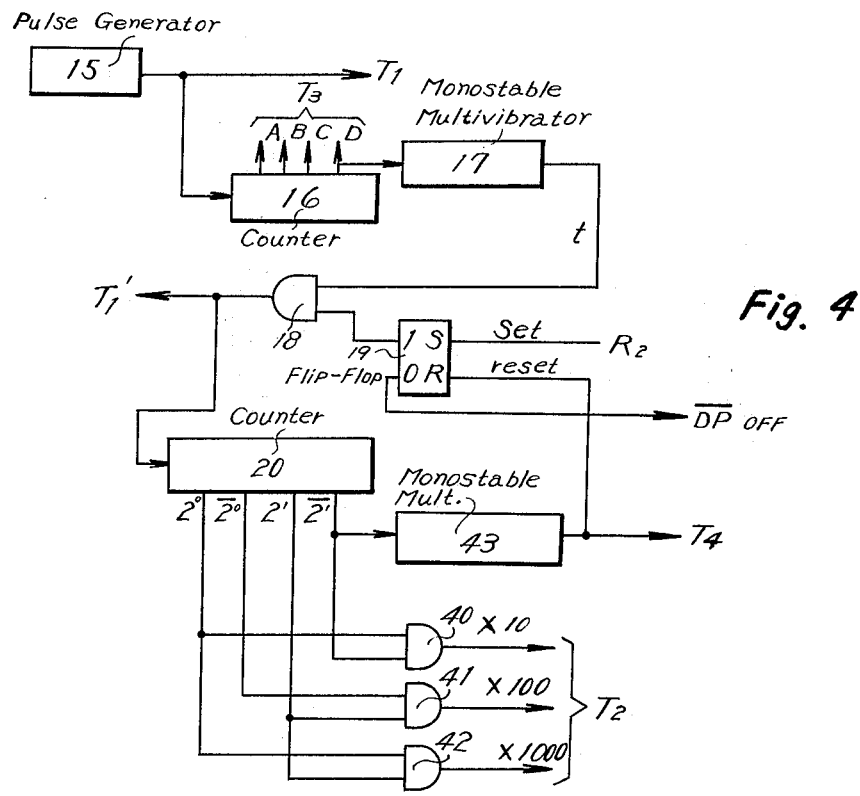
FIG. 4 is a more detailed diagram of the clock pulse generating circuit (J) of FIG. 2.

FIG. 4 shows a pulse generator 15 furnishing signals $T_1$. Signals $T_1$ are applied to counter 16 whose output signals control display unit N, as will be discussed in greater detail below. The counter counts in accordance with a binary code, a change of state in the last bit D being applied to monostable multivibrator 17 which furnishes a relatively short duration output pulse $t$. Pulse $t$ is applied to one input of an AND gate 18 whose other input is supplied the 1 output of a flip-flop 19. Flip-flop 19 is switched to the SET state (wherein a signal appears at its 1 output) by position control signal $R_2$. Pulses $T'_1$ at the output AND gate 18 are applied to a second counter 20. Counter 20 is a two bit counter whose outputs are connected in pairs to form the inputs for AND gates 40, 41 and 42. The outputs of AND gates 40, 41 and 42, are respectively the $\times 10, \times 100$ and $\times 1000$ gating pulses $T_2$. It will be noted that, when the count on counter 20 is zero, that is with signals $\overline{2}^0$ and $\overline{2'}$ energized, no pulse $T_2$ is furnished. For a count of 1 on counter 20, signals $2^0$ and $\overline{2'}$ are present simultaneously, thereby causing AND gate 40 to furnish an output signal. For a count of 2 on counter 20 signals $2^0$ and $2'$ are simultaneously present, causing AND gate 41 to furnish its output. Finally, AND gate 42 furnishes an output for count 3 on counter 20. As the count on counter 20 changes from a count of 3 to a count zero, a change in state of stage $2'$ of counter 20 is used to switch monostable multivibrator 43 to the unstable state where it furnishes a short pulse $T_4$ suitable for resetting flip-flop 19. No further pulse $T_2$ will thus be generated until receipt of the next position control signal $R_2$ following inserting of the next ticket.

The gating pulses $T_2$ generated in unit J described above are applied to the counter output gating circuit of FIG. 5a.

FIG. 5a comprises four sets of three AND gates each, the outputs of each set of AND gates being connected to the inputs of an OR gate. The outputs of the OR gates constitute the desired signals $k$. Each set of AND gates has one AND gate gated by the × 10 pulse, one gated by the × 100 pulse and one gated by the × 1000 pulse. Thus, application of the × 10 pulse causes a signal to be applied to the second input of AND gate 46 in the first set of AND gates and of the corresponding AND gates in the remaining sets. The output of OR gate 47 will thus be the A bit of counter 4c while the outputs of the remaining OR gates will be the B, C, and D bits of counter 4c.

As shown in FIG. 5b, the signal stored in counter 4a, corresponding to the markings in FIG. 1, is a zero. Thus all bits $k_A$, $k_B$, $k_C$ and $k_D$ will have a low output in response to the × 1000 gating signal. For counter 4b, having a stored count of one, $k_A$ will have a high output while $k_B$, $k_C$ and $k_D$ will all have low outputs. Similarly, counter 4c, having a stored count of two, will have a high output from the $k_B$ and low outputs from $k_A$, $k_C$ and $k_D$. The resulting $k$ outputs are shown in FIG. 5c plotted with respect to time. Thus, under control of the × 10 $t_2$ pulse, OR gate 48 will all have a high output while OR gates 47, 49 and 50 will all have a low output. At the time of the × 100 pulse $k_A$ will have a high output while $k_B$, $k_C$ and $k_D$ will all have low outputs. At the time of the × 1000 $T_2$ pulse, no pulses will be furnished at any of the $k$ outputs. The signals at the $k$ outputs in FIG. 5a are herein referred to as the counting signals.

Figure 6A:
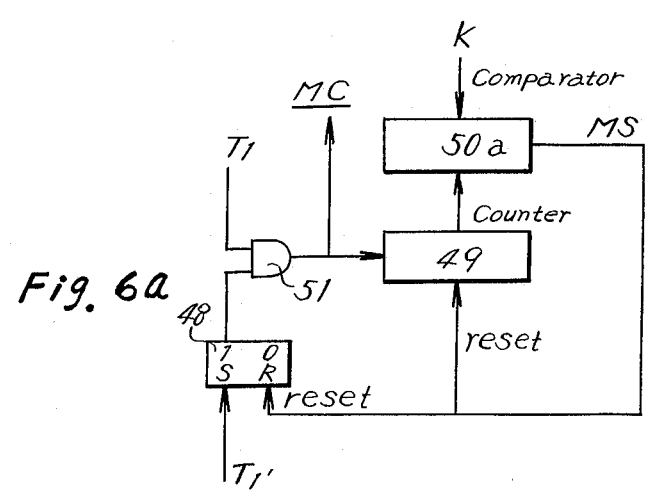
FIG. 6a is a more detailed diagram of the pulse sequence furnishing means (L) of FIG. 2.

Each of the counting signals is now to be used to control the furnishing of a corresponding pulse sequence to the price adder means, namely counter MT. The relevant circuit is shown in FIG. 6a. The pulses furnished by pulse generator 15 of FIG. 4 are applied to one input of an AND gate 51. To its other input is applied the 1 output of a flip-flop 48. Flip-flop 48 is set by pulse $T'_1$, that is a pulse synchronized with pulses $T_2$. The output of AND gate 51 is a pulse sequence $\underline{MC}$ which is applied to the input of counter MT and to the input of a further counter 49. The output of counter 49 is compared in a comparator 50 to the $k$ signals, that is the counting signals. Upon coincidence, a signal is furnished at the output MS of counter 50 which is used to reset flip-flop 48. It is also used to reset counter 49. The pulse sequence $\underline{MC}$ thus has a number of pulses equal to the number signified by each counting signal $k$.

A preferred embodiment of comparator 50a is shown in FIG. 6b. As shown in FIG. 6b, the ABCD bits of counting signals $k$ are each applied to one input of an OR gate 61, 62, 63 and 64, respectively. The corresponding bits of the output of counter 49 are applied to the second inputs of these OR gates. The output of each OR gate is inverted and applied to the input of an AND gate 65. The coincidence signal MS appears at the output or AND gate 65. OR gate 61–64 are exclusive OR gates, that is a signal is furnished as their outputs only when one of the other of the inputs is high and not when both inputs are either high or low. Thus, a signal MS can appear only when the output signal of counter 49 is exactly equal to the counting signal $k$, that is when each bit of the output of counter 49 is equal to the corresponding bit in the counting signal.

The resulting pulse sequences $\underline{MC}$ are shown on the so-labeled line in FIG. 6c. Two pulses are generated on line MC during the time of gating by signal × 10. The × 100 signal causes one pulse to appear on line MC since signal MS resets counter 49 and flip-flop 48 after the appearance of one pulse. Similarly, the × 1000 $T_2$ signal causes no pulse to appear on line MC. These pulses are then added to previous totals stored in counter MT. The signal stored in counter MT is thus a signal signifying the sum of the prices of all items since the last time the counter was cleared. Clearing of the counter takes place by a pulse $CL_2$. This is one of the pulses resulting from the activation by the cashier of switch $s_3$, which will be discussed below.

The signals on line MC are also applied to the counting input of the grand total counting circuit GT. Since the latter is to furnish a signal indicating the sum of the prices of all items sold, for example, during a day, the clear signal $CL_2$ is not applied thereto.

Figure 7:
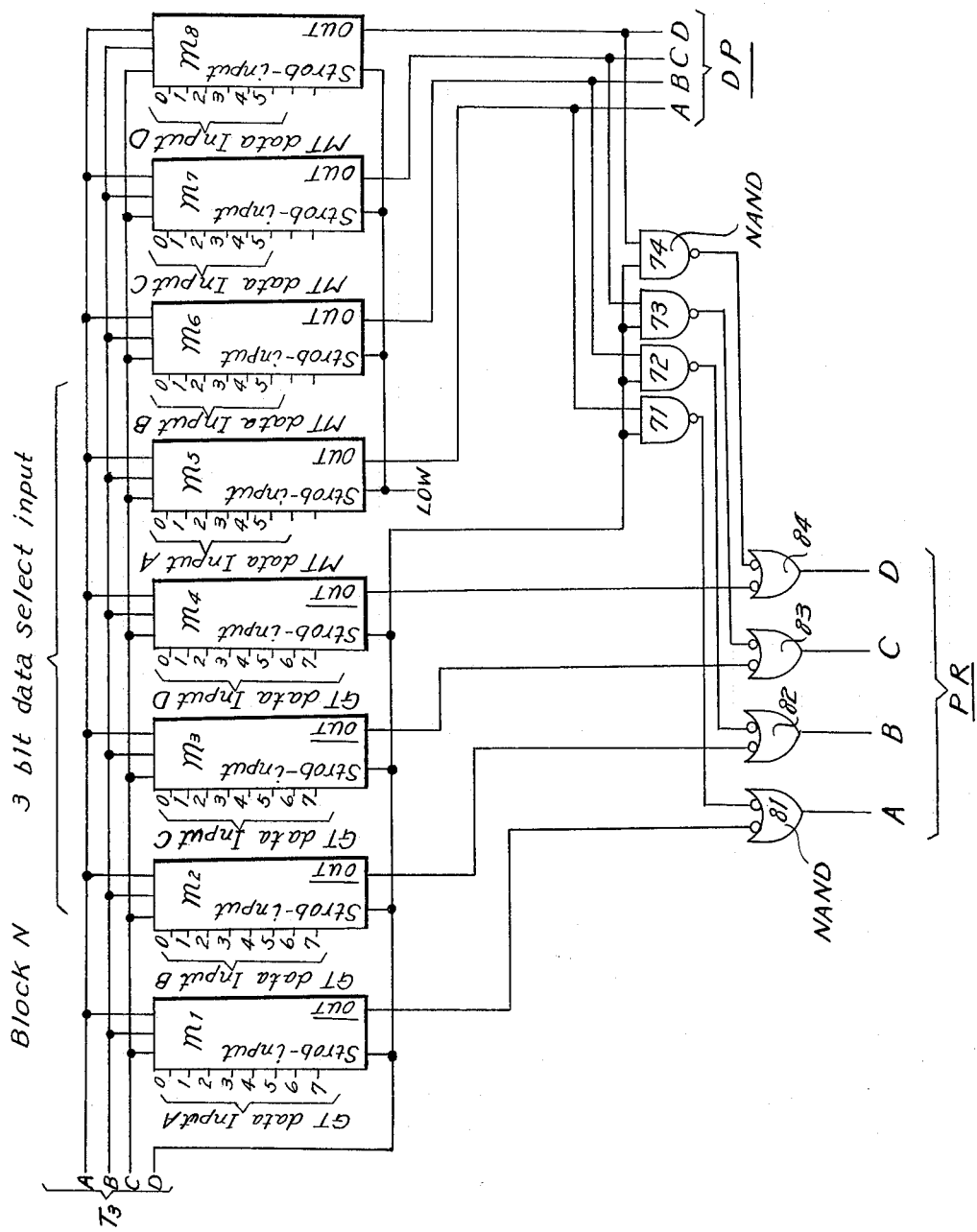
FIG. 7 is a diagram showing the control circuit (N) for driving the print-out in display means.

The circuit of FIG. 7 shows the multiplexers required to furnish the display signals $\underline{DP}$ and the printing signals $\underline{PR}$ required to effect a print-out and a display of the numbers stored in counter $\underline{MT}$. Let it be assumed that counter MT has six columns while counter GT has eight columns. This is more than adequate to store the day's total and the total for each transaction since each column represents a particular decimal place. Since the numbers are stored in a binary coded decimal form, the signal in each column will be represented by four bits. Thus, four multiplexers $m_1$–$m_4$ are assigned to the GT counter and four multiplexers $m_5$–$m_8$ are assigned to the MT counter. The information is entered into the multiplexers in parallel, that is the first bits in columns 0–7 of counter GT are entered into multiplexer $m_1$ simultaneously, the second bits into multiplexer $m_2$, etc. Similarly, the first bits in columns 0–5 of counter MT are entered simultaneously into multiplexer $m_5$, the second bits into multiplexer $m_6$, etc. The display contemplated for the present invention is a display wherein an indicator is furnished for each decimal place. The indicators are not continuously energized, but are energized cyclically at a sufficiently rapid rate so that persistence of vision causes the output to appear steady. This cyclical output of the digits of each decimal place is accomplished under control of the signals $T_3$. Specifically, the A, B and C counts from counter 16 of FIG. 3 are used to gate all the bits in each column 0–5 in sequence. The D signal of pulses $T_3$ is used to control the output, that is it is used as a strobe so that output signals $\underline{DP}$ appear only when the D signal is low.

The total stored in counter MT and the total in counter GT are also to be available for printout. For this purpose, NAND gates 71–74 each have one input connected to receive one bit in the DT signal and a second input connected to the D signal of signals $T_3$. The output NAND gates 71–74 are applied to the first input further NAND gates 81–84. The second inputs of NAND gates 81–84 are connected to the multiplexer outputs of multiplexers $m_1$–$m_4$, that is the multiplexer storing GT totals. Since the multiplexers operate to furnish a low signal from the "out" terminal or a high signal from the "$\overline{\text{out}}$" terminal in response to a high "strobe", signals from counter MT will appear to constitute the $\underline{\text{PR}}$ signals when the D signal is high and the $\underline{\text{PR}}$ signals will represent the grand total decimal places when the strobe is low. This results from the fact that the output of NAND gates 71–74 is high when the strobe is high, independent of the DP signal values, while no output is furnished from the GT multiplexers when the strobe is low.

The start of the printer operation is controlled by activation of switch $S_3$ of FIG. 2. Activation of the switch causes a pulse furnishing circuit CL similar to circuit $F_1$, to furnish signals $CL_1$ and $CL_2$. Signal $CL_1$ is applied to the starting circuit ST of the printer. This furnishes the $\underline{\text{ST}}$ signal which starts the printer by first advancing the paper by one line and then printing out in accordance with the $\underline{\text{PR}}$ signals furnished, as described above, from the multiplexer unit. Pulse $CL_2$ clears counter MT after the print-out has been finished.

Further, FIG. 2 shows a switch $S_1$. Activation of switch $S_1$ causes the paper in the printer to be advanced by one line without subsequent printing.

Switch PW on FIG. 2 is a power switch activation of which will serve to clear both counters MT and GT. When switch PW is on, power is supplied to all circuits.

If an error has been made, and the price of the next subsequent ticket is to be subtracted from the total in adders MT and GT, switch $S_2$ is pressed. This causes the updown control circuit UD to furnish a signal switching both counters to the down-counting state. Upon insertion of the next subsequent meal ticket, the counters MT and GT will subtract input signals $\underline{\text{MC}}$ from previous totals. When the count has been completed, signal $T_4$ (see FIG. 4) is used to reset the up-down control circuit so that the insertion of the next subsequent ticket will again cause counters MT and GT to count up. In a preferred embodiment, the up-down control circuit is a flip-flop which is set by activation of switch $S_2$ and reset upon receipt of pulse $T_4$.

The transfer of signals from the second buffer storage means $H_1$ and $H_2$ to a plurality of counters, each counting the number of items in a particular category, must still be discussed. Referring first to FIG. 9, it is seen that the signal outputs of the buffer storage means are applied to the inputs of decoder 191 which has 64 outputs, each associated with one of the catagories. Each of these outputs $P_1$–$P_{64}$ is applied to the first input of two AND gates $A_1, A_1' \ldots A_{64}, A'_{64}$. The second input to AND gates $A_1$–$A_{64}$ is a signal $x_u$, while the second input to AND gates $A'_1$–$A'_{64}$ is a signal $X_d$. The output of AND gate $A_1$ is applied to the forward counting input of a counter 101 while the output of AND gate $A'_1$ is applied to the reverse (down) counting input of the same counter. The outputs of the remaining AND gates are similarly connected, all A gates furnishing signals to the forward counting inputs and all A' gates furnishing signals to the reverse counting inputs of the corresponding counters.

The circuit operates as follows: The category marking signals stored in counters H1 and H2 cause energization of one of the outputs $P_1$–$P_{64}$. The so-energized output serves to gate the associated AND gate to the conductive state. For each ticket, a single pulse is furnished on either line $X_d$ or line $X_u$, as will be discussed with reference to FIG. 8. Thus, the count on whichever counter is associated with the energized output of the decoder is either advanced or set back by one count. As a consequence the number of articles in the particular category is signified by the count on each of the counters 101–164. Under normal conditions and if no error is made by the cashier, the counters will count up. The down counting capability is provided only in case of an error.

The generation of the signals $X_u$ and $X_d$ will now be discussed with reference to FIG. 8. FIG. 8 shows two AND gates 201 and 202, each having three inputs. The first input to each of the AND gate is signal $R_1$. The second input of AND gate 201 is signal $\underline{\text{UD}}$ which indicates that a down counting is to take place, while the second input of both AND gates is a signal $\overline{\text{SM}}$. Signal $\overline{\text{SM}}$ is an inhibit signal which is furnished when switch S4 of FIG. 2 is activated. Switch S4 is activated when the system of FIG. 2 is to act as a calculator. This will be discussed further below. In any case, signal $X_d$ is furnished in the simultaneous presence of signals $\underline{\text{UD}}$, $R_1$ and $\overline{\text{SM}}$. The signal $X_u$ is a single pulse generated in response to signal $R_1$ in the presence of the inverted signal $\underline{\text{UD}}$ and $\overline{\text{SM}}$. Pulses $X_d$ and $X_u$, when applied to the category counters of FIG. 9, cause these counters to be properly advanced or decreased, as described in reference to FIG. 9.

If it is desired that the system of FIG. 2 serve as a calculator only, switch S4 is closed, causing a generation of signal $\overline{\text{SM}}$. Signal $\overline{\text{SM}}$ causes the cashier box I to be locked and further inhibits the start signal $\underline{\text{ST}}$ for printer PR and, as mentioned with reference to FIG. 9, the generation of the pulses for application to the category counters. Signal SM further blocks gate M, serving as an input to counter GT, thereby blocking signals MC from counter GT. Activation of switch S4 thus causes counts to be added to counter MT only. These counts are then displayed in display unit DP but are not printed. The 0 output ($\overline{DP_{off}}$) of flip-flop 19 in FIG. 4 is introduced to display unit DP to gate the drive signal of display circuit and to operate to cut off the display while the signal in unit MT is changing.

It will be evident from the foregoing discussion that the present system, as shown in FIG. 2 in a preferred embodiment, is equally adaptable to meal tickets in restaurants and to price tags on items being sold in a department store as well as many other applications. If a price tag is, for example pasted on the article to be sold, the machine perforations 10 may be used to detach a portion of the price tag and this portion may be then inserted into the system of the present invention. The different storage units as well as the counters and electric circuits interconnecting the same may also be embodied in circuits other than those shown in the figures without in any way departing from the spirit of the present invention. What is claimed as new and desired to be protected by letters patent is set forth in the appended claims.

I claim:

1. Cash register computing system for furnishing first and second output signals respectively signifying the total price of a plurality of items in a transaction and the total number of items in each of a determined plurality of categories in said transaction, comprising, in combination, a plurality of tickets each carrying machine readable price category markings respectively signifying the price and category of at least one of said items, each of said tickets having a plurality of columns and a plurality of lines intersecting said plurality of columns, said price markings being located in a first region of said ticket bounded by a first and second one of said lines, said category markings being located in a second region of said tickets different from said first region; transport means for transporting each said tickets along a predetermined path in a direction parallel to said columns; read-out means for reading out said price and category markings and furnishing corresponding price and category marking signals, positioned at a predetermined location along said predetermined path, said read-out means comprising a plurality of read-out means corresponding in number to said plurality of columns; first and second buffer storage means connected to said read-out means for, respectively, storing said price and category marking signals and furnishing corresponding stored price and stored category marking signals, said first buffer storage means comprising a plurality of counters each connected to a corresponding one of said read-out means, each for counting the price marking signals furnished by said corresponding one of said read-out means and storing a counting signal corresponging to the number of so-counted price marking signals; a plurality of position control means positioned along said predetermined path, each for furnishing a position control signal when a predetermined part of said ticket path is at a corresponding predetermined location along said predetermined path, said position control means comprising first and second position pulse furnishing means for furnishing a first and second position pulse when said predetermined part of said ticket path is at said first and second predetermined location along said predetermined path respectively; gating means connected to said position control means and said first and second buffer storage means for controlling entry of signals into said buffer storage means in response to corresponding ones of said position control signals, said gating means comprising a plurality of transmission gates connected between said read-out means and said buffer storage means, said gating means having a conductive state in the presence of a gating signal applied thereto; means for furnishing said gating signals from receipt of said first to receipt of said second position pulse; price adder means connected to said first buffer storage means for adding said stored price marking signals read from one of said tickets to price marking signals read from previous ones of said tickets in said transaction and furnishing said first output signals following the addition of stored price marking signals read from the last of said tickets in said transaction; and a plurality of category adder means connected to the output of said second buffer storage means, each for counting stored category marking signals signifying a predetermined one of said categories only, whereby said plurality of category added means furnishes said second output signals following addition of stored category marking signals read from the last of said tickets in said transaction.

2. A system as set forth in claim 1, wherein said means for furnishing said gating signal comprises a position control flip-flop having a SET state in response to said first position pulse and a RESET state in response to said second position pulse.

3. The system as set forth in claim 1, further comprising means for connecting said first position pulse furnishing means to said plurality of counters in such a manner that said counters are reset to zero in response to said first position pulse.

4. The system as set forth in claim 3, wherein said second buffer storage means has a first plurality of storage locations corresponding in number to the number of said plurality of read-out means; wherein said gating means further comprises means for connecting said first plurality of storage locations of said second buffer storage means to said second position pulse furnishing means in such a when said third position control flip-flop is in a set state.

5. The system as set forth in claim 4, wherein said second buffer storage means further comprises a second plurality of storage locations corresponding in number to said plurality of read-out means; wherein said position control means further comprises third and fourth position pulse furnishing means for furnishing, respectively, a third and fourth position pulse when said predetermined part of said ticket passes a third and fourth predetermined location along said predetermined path; means for connecting said second plurality of storage locations to said third pulse furnishing means in such a manner that said second plurality of storage locations is cleared in response to said third position pulse; a third and fourth position control flip-flop having a set input respectively connected to said third and fourth position pulse furnishing means, each of said position control flip-flops further having a set output, a reset input and a reset output, means for connecting said reset input of said third position control flip-flop to said fourth position pulse furnishing means, and means for connecting said set output of said third position control flip-flop to said second plurality of storage locations in such a manner that signals are transferred from said read-out means to said second plurality of storage locations only signals furnished by said corresponding one of said photoelectric transducing means and storing a counting signal corresponding to the number of so-counted price marking signals.

6. The system as set forth in claim 5, wherein each of said storage locations in said second buffer storage means represents a bit in a binary code; further comprising code converter means having a plurality of inputs each connected to one of said second buffer storage locations and a plurality of outputs corresponding in number to said plurality of categories, for furnishing a signal at a corresponding one of said outputs in response to each combination of signals at said inputs; and wherein said category counter means comprise a plurality of counters one connected to each of said outputs of said code converter means, each for counting the number of signals at the corresponding one of said outputs, whereby each of said counters furnishing a signal signifying the total number of items in a predetermined one of said categories in said transaction.

7. Cash register computing system for furnishing first and second output signals respectively signifying the total price of a plurality of items in a transaction and the total number of items in each of a predetermined plurality of categories in said transaction, comprising, in combination, a plurality of tickets each carrying machine readable price and category markings respectively signifying the price and category of one of said items, each of said tickets having a plurality of columns and a plurality of lines intersecting said plurality of columns, said price markings being located in a first region of said ticket bounded by a first and second one of said lines, said category markings being located in a second region of said ticket different from said first region; transport means for transporting said ticket along a predetermined path in a direction parallel to said columns; read-out means positioned at a predetermined location along said predetermined path, for reading out said price and category markings and furnishing corresponding price and category marking signals, said read-out means comprising a plurality of read-out elements corresponding in number to said plurality of columns; first and second buffer storage means connected to said read-out means for, respectively, storing said price and category marking signals and furnishing corresponding stored price and stored category marking signals, said first buffer storage means comprising a plurality of counters each connected to a corresponding one of said read-out elements, each for counting the price marking signals furnished by said corresponding one of said read-out elements and storing a counting signal corresponding to the number of so-counted price marking signals; a plurality of position control means positioned along said predetermined path, each for furnishing a position control signal when a predetermined part of said ticket is at a corresponding predetermined location along said predetermined path; gating means connected to said position control means and said first and second buffer storage means for controlling entry of signals to said buffer storage means in response to corresponding ones of said position control signals; price adder means connected to said first buffer storage means for adding said stored price marking signals read from one of said tickets to price marking signals read from previous ones of said tickets in said transaction and furnishing said first output signals following the addition of stored price marking signals read from the last of said ticket in said transaction, said price adder means having a counting input, said price adder means further comprising means for applying a plurality of pulse sequences to said counting input, each under control of a counting signal stored in one of said counters of said first buffer storage means, each including a number of pulses equal to the number signified by the corresponding one of said counting signals, said means for applying a plurality of pulse sequences comprising comparator means having a first and second comparator input and a comparator output, for furnishing a comparator output signal when the signals at said first and second inputs are equal, pulse generator means, pulse counting means having a counting output connected to said second input of said comparator means, first gating means connected to said position control means, said first buffer storage means and first said input of said comparator means, for connecting said counters in said first buffer storage means to said first input of said comparator means in a predetermined sequence at predetermined time intervals following a predetermined one of said position control signals, second gating means connected to said first gating means, said pulse generator means, said pulse counting means and said counting input of said price adder means for connecting said pulse generator means to said pulse counting means and said counting input of said pulse adder means in synchronism with the application of said signals to said first input of said comparator means and for disconnecting pulse generator means from pulse counting means and said counting input of said price adder means in response to said comparator output signals; and a plurality of category adder means connected to the output of said second buffer storage means, each for counting stored category marking signals signifying a predetermined one of said categories only, whereby said plurality of category adder means furnishes said second output signals following addition of stored category marking signals read from the last of said tickets in said transaction.

8. The system as set forth in claim 7, wherein said price adder means has a predetermined capacity; further comprising grand total adder means connected in parallel with said price adder means and having a capacity exceeding said predetermined capacity, for furnishing grand total output signals signifying the total price of a plurality of items in transactions occurring during a predetermined time interval.

9. The system as set forth in claim 8, wherein said grand total adder means and said price adder means each comprise up-down counting means operative to count down upon receipt of a down control signal; further comprising means for furnishing said down control signal under external control, whereby said grand total adder means and said price adder means are operative to subtract erroneously added prices from said grand total output signal and said first output signal respectively.

10. The system as set forth in claim 9, further comprising display means connected to said price adder means for furnishing a visual output corresponding to said first output signals.

11. The system as set forth in claim 10, wherein said first output signals comprise a plurality of four bit signals each signifying one decimal place; further comprising multiplexer means and said display means for receiving said first output signals in parallel and furnishing said first output signals in series to said display means.

12. The system as set forth in claim 11, further comprising printout means responsive to print-out signals for printing out data corresponding to said print-out signals; and gating means interconnected between said grand total adder means and said multiplexer means for furnishing print-out signals corresponding to said first output signals and said grand total adder output signals to said print-out means.

13. The system as set forth in claim 12, wherein said grand total output signal comprises a plurality of individual signals each having a plurality of bits equal to the number of bits in each of said output signals, each corresponding to a predetermined decimal place; further comprising additional multiplexer means interconnected between said grand total adder means and said gating means for receiving said individual signals in parallel and said furnishing individual signals in series to said gating means.

14. The system as set forth in claim 12, further comprising synchronizing means for synchronizing the operation of said multiplexer means; said additional multiplexer means, said print-out means and said gating means.

15. The system as set forth in claim 14, further comprising computers switch means operable upon external activation, for disabling said grand total adder means, said display means and said printer means, whereby activation of said computer switch means converts said system to a calculating system only.

16. Cash register computing system for furnishing output signals signifying the total number of items in each of a predetermined plurality of categories in a transaction, comprising, in combination, a plurality of tickets each carrying machine readable category markings signifying the category of one of said items; read-out means for reading out said category markings and furnishing corresponding category marking signals; buffer storage means connected to said read-out means for storing said category marking signals and furnishing corresponding stored category marking signals; a plurality of category adder means corresponding in number to said determined plurality of categories; decoder means having a plurality of inputs connected to said buffer storage means and a plurality of outputs each connected to one of said category adder means, for furnishing a decoder output signal at a corresponding one of said outputs in response to each of said stored category marking signals; and means for advancing the one of said plurality of category adder means receiving said decoder output signal by one count, whereby said plurality of category adder means furnishes said output signals following receipt of the decoder output signal corresponding to the stored marking signals read from the last of said plurality of tickets.

17. The system as set forth in claim 16, wherein said read-out means is positioned at a predetermined location; further comprising transport means for transporting said ticket along a predetermined path including said predetermined location; further comprising a plurality of position control means positioned along said predetermined path, each for furnishing a position control signal when a predetermined part of said ticket passes a corresponding predetermined location along said predetermined path; and gating means connected to said position control means and said second buffer storage means for controlling entry of signals into said buffer storage means in response to corresponding ones of said position control signals.

18. The system as set forth in claim 17, wherein each of said tickets has a plurality of columns extending in the direction of transport of said ticket and a plurality of lines intersecting said plurality of columns; wherein said category markings are in a binary code, each category marking comprising a plurality of bits, each bit being represented by the absence or presence of a mark in one of said columns along at least one of said lines; and wherein said read-out means comprise a plurality of read-out elements corresponding in number to said plurality of columns.

19. The system as set forth in claim 18, wherein said plurality of read-out elements comprises optical read-out means including a source of radiation and a plurality of photoelectric transducing means each positioned in such a manner that markings in the corresponding one of said columns change the quantity of radiation received by said photoelectric transducing means when passing said predetermined location, whereby each of said photoelectric transducing means furnishes marking signals corresponding to markings in a predetermined one of said columns.

20. The system as set forth in claim 19, wherein said first buffer storage means comprises a plurality of counters each connected to a corresponding one of said photoelectric transducing means, each for counting the price marking manner that said first plurality of storage locations is cleared in response to said second position pulse, and a second position control flip-flop having a set input connected to said second position pulse furnishing means and a set output connected to said second buffer storage means in such a manner that signals are entered into said first plurality of storage locations only when said second position control flip-flop is in a SET state.

21. The system as set forth in claim 20, wherein said price adder means has a counting input; further comprising means for applying a plurality of pulse sequences to said counting input, each under control of a counting signal stored in one of said counters of said first buffer storage means, each including a number of pulses equal to the number signified by the corresponding one of said counting signals.

* * * * *